(12) United States Patent
Vigano' et al.

(10) Patent No.: US 11,485,120 B2
(45) Date of Patent: Nov. 1, 2022

(54) PACKAGING METHOD FOR FRUITS AND VEGETABLES

(71) Applicant: Cryovac, LLC, Charlotte, NC (US)

(72) Inventors: Valeria Vigano', Buguggiate (IT); Serena Stracuzzi, Parabiago (IT)

(73) Assignee: Cryovac, LLC, Charlotte, NC (US)

( * ) Notice: Subject to any disclaimer, the term of this patent is extended or adjusted under 35 U.S.C. 154(b) by 102 days.

(21) Appl. No.: 16/613,043

(22) PCT Filed: May 16, 2018

(86) PCT No.: PCT/EP2018/062792
§ 371 (c)(1),
(2) Date: Nov. 12, 2019

(87) PCT Pub. No.: WO2018/210955
PCT Pub. Date: Nov. 22, 2018

(65) Prior Publication Data
US 2020/0163351 A1   May 28, 2020

(30) Foreign Application Priority Data

May 16, 2017   (EP) ..................... 17171343

(51) Int. Cl.
*B32B 27/32* (2006.01)
*A23B 7/152* (2006.01)
(Continued)

(52) U.S. Cl.
CPC .............. *B32B 27/32* (2013.01); *A23B 7/152* (2013.01); *B32B 27/08* (2013.01); *B65D 65/20* (2013.01);
(Continued)

(58) Field of Classification Search
CPC ........ A23B 7/152; A23B 7/148; B65D 81/30; B65D 85/34; B65D 81/2084; B65D 75/26;
(Continued)

(56) References Cited

U.S. PATENT DOCUMENTS 4,841,605 A   6/1989   Schuierer
5,962,092 A   10/1999  Kuo et al.
(Continued)

FOREIGN PATENT DOCUMENTS

JP   2003169598 A  *  6/2003
JP   2003268242 A     9/2003
(Continued)

OTHER PUBLICATIONS

Yan et al: "Identification of critical quality parameters and optimal environment conditions of intermediate moisture content banana during storage", Journal of Food Engineering, Barking, Essex, GB, vol. 85, No. 2. Oct. 18, 2007 (Oct. 18, 2007), pp. 163-172, XP022303140.
(Continued)

*Primary Examiner* — James C Yager
(74) *Attorney, Agent, or Firm* — Jason R. Womer

(57) ABSTRACT

The present invention relates to a method for packaging fruits and vegetables by means of a film endowed with specific permeability and light transmittance properties.

18 Claims, 6 Drawing Sheets

(51) Int. Cl.
  *B65D 65/40* (2006.01)
  *B65D 75/26* (2006.01)
  *B65D 81/20* (2006.01)
  *B65D 81/30* (2006.01)
  *B65D 85/34* (2006.01)
  *B65D 65/20* (2006.01)
  *B32B 27/08* (2006.01)

(52) U.S. Cl.
  CPC ............. *B65D 65/40* (2013.01); *B65D 75/26* (2013.01); *B65D 81/2084* (2013.01); *B65D 81/30* (2013.01); *B65D 85/34* (2013.01); *B32B 2250/246* (2013.01); *B32B 2307/31* (2013.01); *B32B 2307/402* (2013.01); *B32B 2307/71* (2013.01); *B32B 2307/724* (2013.01); *B32B 2439/70* (2013.01); *B65D 2565/388* (2013.01); *Y10T 428/1328* (2015.01); *Y10T 428/1331* (2015.01); *Y10T 428/1334* (2015.01); *Y10T 428/1345* (2015.01); *Y10T 428/1352* (2015.01)

(58) Field of Classification Search
  CPC .. B65D 65/40; B65D 65/20; B65D 2565/388; B32B 27/08; B32B 27/32; B32B 2307/724; B32B 2250/246; B32B 2307/31; B32B 2307/402; B32B 2307/71; B32B 2439/70; Y10T 428/1331; Y10T 428/1334; Y10T 428/1352; Y10T 428/1328; Y10T 428/1345
  See application file for complete search history.

(56) References Cited

U.S. PATENT DOCUMENTS

| | | | |
|---|---|---|---|
| 8,557,372 B2 | 10/2013 | Kubik et al. | |
| 2007/0042089 A1* | 2/2007 | Grah | B29C 71/04 426/106 |
| 2007/0197648 A1* | 8/2007 | Inooka | A61P 17/04 514/563 |
| 2008/0299266 A1 | 12/2008 | Clarke et al. | |
| 2010/0204523 A1* | 8/2010 | Tominaga | B65D 81/30 568/816 |
| 2011/0293802 A1 | 12/2011 | Maynor et al. | |
| 2012/0031797 A1 | 2/2012 | Shubham | |
| 2015/0232794 A1* | 8/2015 | Rasmussen | B65D 65/20 426/418 |
| 2016/0001946 A1* | 1/2016 | Tijssen | B65D 85/34 426/106 |

FOREIGN PATENT DOCUMENTS

| | | |
|---|---|---|
| JP | 2003284487 A | 10/2003 |
| JP | 2004307753 A | 11/2004 |
| JP | 03677543 B2 | 8/2005 |
| JP | 03824915 B2 | 9/2006 |
| WO | 2011029950 A1 | 3/2011 |
| WO | 2011151305 A1 | 12/2011 |
| WO | 2014099396 A1 | 6/2014 |
| WO | 2014157400 A1 | 10/2014 |
| WO | 2015083558 A1 | 6/2015 |

OTHER PUBLICATIONS

Banana Bunch Cover Bag-Xiamen OMS Plastic Co.,Ltd, at http://www.omsfilm.com/productinfor-96-Banana_Bunch_Cover_Bag.html, taken at Dec. 18, 2015 1:56 PM.
Bunch Covers for Improving Plantain and Banana Peel Quality, Postharvest Handling Technical Bulletin, Jun. 2003.
Rameshwar Prasad, R.B. Ram, Vikas Kumar, Sandeep Kumar Rajvanshi, Study on Effect of Different Packaging Materials on Shelf Life of Banana (*Musa paradisiaca* L.) cv. Harichal Under Different Conditions, International Journal of Pure & Applied Bioscience, Aug. 2015.
Muhammad Saed Khan, Alam Zeb, Kamran Rahatullah, Ihsanullah, Nazeer Ahmed and Saeed Ahmed, Storage Life Extension of Plum Fruit with Different Colored Packaging and Storage Temperatures, IOSR Journal Of Environmental Science, Toxicology And Food Technology (IOSR-JESTFT) e-ISSN: 2319-2402,p. ISSN: 2319-2399. vol. 7, Issue 3 (Nov.-Dec. 2013), pp. 86-93 vww.iosrjournals.org.

* cited by examiner

DOP5

DOP9

PACKAGING METHOD FOR FRUITS AND VEGETABLES

TECHNICAL FIELD

The present invention relates to a new method for packaging fruits and vegetables.

BACKGROUND ART

Ripening is a natural process leading fruits and vegetables to their optimal growth and causing them to become palatable to humans. Some modifications due to ripening, which are common to many fruits and vegetables are color change, pulp softening, developing of volatile molecules which provide for the typical aromas (e.g. fruit esters) and, mainly for fruits, sugar increase. Ripening occurs spontaneously in nature as the fruits or vegetables are on the plant; the ripening time is affected, for each fruit or vegetable, by the environmental temperature and humidity.

For commercial reasons it is often useful to harvest the fruits or vegetables before they are completely ripe, because in these conditions they are generally more resistant to storage and transport from the place of origin to market. In this case, once they reach their market destination, ripening can be artificially accelerated by some chemicals, typically ethylene, a naturally occurring ripening hormone which is responsible for fruit maturation. This process can only be done for the so-called "climacteric fruits" which, being sensitive to ethylene, will continue ripening even after harvesting from the plant. While ripening, most fruits and vegetables also change the color of the pulp and/or of the skin. Color change is due to pigments which either are produced by the fruit as it ripens, or were already present in the fruit, but become visible after chlorophyll is degraded during ripening.

Bananas are the most popular and consumed tropical fruits in the world. Unfortunately, despite their popularity, they are easily perishable fruits and have a very short shelf life that creates challenges for both producers and distributors and limits the transportation, storage and sale of these fruits.

Bananas are harvested while still green and are treated with ethylene to stimulate ripening before distribution and sale. During this process, the starch contained in the green bananas changes into sugar and the color of the fruits turns from green to yellow. The fruits generally ripen within 4-5 days after ethylene treatment. Bananas are sold primarily when they are at this yellow stage of ripening. Only 1-3 days after they have reached maturation, brown flecks begin to form on the peel of the fruits; brown flecks formation is accelerated by light exposure. Bananas which have undergone prolonged light exposure may show brown flecks or even brown areas on the skin without any damage in their pulp; however, brown flecks make them unattractive and unsuitable for marketing. In view of the above, a potential extension of the duration of the stage where the fruit is ripe and without brown flecks could significantly enhance shelf life and market value of bananas.

One approach followed in order to improve the shelf life of bananas has been to improve the quality of the fruit and reduce physical and insect damage to the peel in the pre-harvesting stage. This is obtained by protecting the fruits during development, while still on the trees, with non-perforated or perforated films of low density polyethylene, generally colored white, translucent blue or silver. This practice has been demonstrated to improve postharvest shelf life.

Another approach has been to improve storage conditions after harvesting of bananas. For example, it has been demonstrated that storage of bananas at low temperatures slows ripening and increases the shelf life.

Mangoes are other tropical fruits commonly widespread throughout the world. The fruits develop on the tree starting at the immature stage, and progress to a mature/unripe stage. Mature/unripe is the typical harvest point for mangos. During transportation, distribution and storage, mangoes progress to a ripe/ready to eat stage for the consumer. In fact, mangoes produce and respond to ethylene, thus ripening normally on their own. Immature mangoes are green colored, and turn to pale orange and then to yellow as they ripe. Generally, in most mangoes varieties, the skin at the ripe/ready to eat stage is yellow. It is therefore desirable to slow ripening of mangoes preserving the greenish or pale orange color typical of the early stages of maturation.

Potatoes are affected by exposure to light, too: in particular, light triggers chlorophyll formation in the skin and upper layers of the potatoes, causing the skin to turn greenish and thus less appealing to the consumer. Light exposure is also responsible for an hazardous drawbacks as it is one of the factors (together with, e.g., stressful growth conditions) leading to an increase in the amount of the alkaloids (solanine and chaconine) in the pulp, which gives potatoes a bitter taste and results in digestive problems; very high alkaloids levels can also cause neurological problem. For these reasons, potatoes must be sheltered from light while stored.

Currently, it is known that ripening and skin color change of fruits and vegetables susceptible to this phenomenon are mainly induced by light having wavelength comprised between about 200 and about 450 nm (ultraviolet light and blue-violet visible light). For this reason, protecting fruits and vegetables from light at the above wavelength is of great relevance to slow their ripening and extend their shelf life.

As regards packaging, different packaging materials able to preserve the freshness of fruits and vegetables have been described.

For example, JP3824915 discloses a polyolefin resin film having a specific selective permeability to oxygen, carbon dioxide and humidity and a ratio of carbon dioxide to oxygen permeability between 3.5 and 4.1. The film is tested in packaging of strawberries and broccoli. It is disclosed that the use of this packaging material, in particular in association with a deoxidation agent added in the package to lower the amount of oxygen, maintains freshness of the fruits and vegetables.

JP2003284487 discloses a perforated permeable film packaging for maintain freshness of fruit and vegetables, having air and water permeability and maintaining an ethanol concentration in the sealed package between 0.001 and 3%.

Studies on the effect of white, yellow and transparent polyethylene packaging on storage life extension have been carried on plump fruit and it has been found that colored packaging is less effective than transparent packaging for extending storage life (Khan et al, IOSR-JESTFT (2013), 7 (3), pp. 86-93).

However, packaging methods able to prolong effectively the shelf life of fruits and vegetables, in particular the most perishable ones, avoiding at the same time undesired skin color changes provoked by exposure to light at the above cited wavelengths, that may affect the consumers' perception of the product, have not been developed yet. Therefore, limited means are available at present for improving preservation of fruits and vegetables during storage.

SUMMARY OF THE INVENTION

The present inventors have now surprisingly found that packaging films having specific permeability to $O_2$, $CO_2$ and water vapour combined with specific light transmittance characteristics significantly increase the shelf life of fruits and vegetables, slowing both ripening and skin color changes due to exposure to UV and blue-violet visible light.

Accordingly, a first object of the present invention is the use of a sealable, optionally oriented, thermoplastic film having:
- an oxygen transmission rate between 8000 and 14000 cc/sqm·day·atm, preferably between 9000 and 13000 cc/sqm·day·atm, more preferably between 10000 and 13000 cc/sqm·day·atm, even more preferably between 11000 and 12000 cc/sqm·day·atm, even more preferably of 11500 cc/sqm·day·atm, measured according to ASTM D-3985 at 23° C. and 0% in-0% out relative humidity,
- a $CO_2$ transmission rate between 25000 to 41000 cc/sqm·day·atm, preferably between 26000 and 40000 cc/sqm·day·atm, more preferably between 27000 and 39000 cc/sqm·day·atm, even more preferably of 28000 cc/sqm·day·atm, measured according to ASTM F-2476, at 23° C. and 0% in-0% out relative humidity,
- a water vapour transmission rate between 8 and 35 g/sqm·day·atm, more preferably between 20 and 30 g/sqm·day·atm, even more preferably of 26 g/sqm·day·atm, measured according to ASTM D1249 at 38° C. and 98% in-0% out relative humidity, and
- a transmittance of less than 70%, preferably less than 60% of light at wavelengths from 100 to 450 nm, preferably from 200 to 450 nm, more preferably from 200 to 400 nm, measured with the method described in the experimental section,
- for packaging fruits and/or vegetables, preferably fruits, more preferably fruits selected from bananas and mangoes.

A second object of the invention is the use of a flexible container obtained by self-sealing a film according to the first object of the invention or by sealing two separate pieces of film according to the first object of the invention for packaging fruits and/or vegetables, preferably fruits, more preferably fruits selected from bananas and mangoes.

A third object of the invention is a method for packaging fruits and/or vegetables, preferably fruits, more preferably fruits selected from bananas and mangoes, comprising the following steps:
a) providing the film according to the present invention,
b) running the film through a former thus forming a tube,
c) inserting one or more fruits and/or vegetables into the tube,
d) sealing the tube longitudinally,
e) sealing and cutting the tube transversally at the beginning and at the end of the package.

A fourth object of the invention is a method for packaging fruits and/or vegetables, preferably fruits, more preferably fruits selected from bananas and mangoes, comprising the following steps:
a) introducing one or more fruits and/or vegetables in a flexible container as described above having an open side;
b) closing the open side of the container by heat sealing.

A fifth object of the invention is a package comprising a film or flexible container according to the present invention and one or more fruits and/or vegetables, preferably fruits, more preferably fruits selected from bananas and mangoes packaged in said film or container.

Definitions

The term "polyethylene" as used herein, refers to heterogeneous polymers such as linear low density polyethylene (LLDPE) with a density usually in the range of from about 0.900 g/cc to about 0.930 g/cc, linear medium density polyethylene (LMDPE) with a density usually in the range of from about 0.930 g/cc to about 0.945 g/cc, medium density polyethylene (MDPE) with a density usually in the range of from about 0.926 g/cc to about 0.940 g/cc and very low and ultra low density polyethylene (VLDPE and ULDPE) with a density lower than about 0.915 g/cc, typically in the range 0.868 to 0.915 g/cc. All these materials generally include copolymers of ethylene with one or more co-monomers selected from (C4-C10)-alpha-olefin such as butene-1, hexene-1, octene-1, etc., in which the molecules of the copolymers comprise long chains with relatively few side chain branches or cross-linked structures.

As used herein, the term "ethylene-vinyl acetate copolymer" or "EVA" refers to a copolymer formed from ethylene and vinyl acetate, wherein the ethylene derived units in the copolymer are present in major amounts; preferably between about 60% and 98% by weight and the vinyl acetate units in the copolymer are present in minor amounts, preferably between about 2% and about 40% by weight.

As used herein, the expression "inner layer" and "internal layer" refer to any film layer having both of its principal surfaces directly adhered to another layer of the film.

As used herein the expression "outer layer" refers to any film layer having only one of its principal surfaces directly adhered to another layer of the film.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing and extrusion coating processes.

As used herein, the term "extrusion coating" refers to processes by which a "coating" of molten polymer(s), comprising one or more layers, is extruded onto a solid "substrate" in order to coat the substrate with the molten polymer coating to bond the substrate and the coating together, thus obtaining a complete film.

As used herein the term "flexible container" refers to bags or pouches. These include, for example: lay-flat, end seal bags made from a seamless tubing and having an open top, first and second folded side edges, and an end seal across a bottom of the bag; lay-flat side seal bags made from a seamless tubing and having an open top, a folded bottom edge and first and second side seals; V-shaped side seal bags made from a seamless tubing and having an open top, a folded bottom edge and first and second side seals, which may be completely angled with respect to the open top, thus providing a triangular bag or substantially straight (i.e. perpendicular to the open top) or partially angled, thus providing a trapezium-like shape; a lay flat pouch made by heat sealing two flat films to one another, the pouch having an open top, a first side seal, a second side seal and a bottom seal.

As used herein, the phrase "a seamless tube or casing" relates to a tube devoid of any seal, which is generally made of a film (co)extruded through a round die.

As used herein the term "sealable thermoplastic film" refers to a thermoplastic film that is sealable to a thermoplastic material by using heat (heat sealing) or pressure or other means known in the art, such as, for example, radio frequency. Heat sealing is preferably performed with a heated dye or a sealing bar.

As used herein the term "oxygen transmission rate" refers to the amount of oxygen gas, expressed in cc, that passes through a section of 1 sqm of the film over a period of 24 hours, as measured at 1 atm, 23° C. and 0% in-0% out relative humidity (RH) with standard test method ASTM D-3985.

As used herein the term "$CO_2$ transmission rate" refers to the amount of $CO_2$, expressed in cc, that passes through a section of 1 sqm of the film over a period of 24 hours, as measured at 1 atm, 23° C. and 0% in-0% out relative humidity (RH) with standard test method ASTM F-2476.

As used herein the term "water vapour transmission rate" refers to the amount of water vapour, expressed in g, that passes through a section of 1 sqm of the film over a period of 24 hours, as measured at 1 atm, 38° C. and 98% in-0% out relative humidity (RH) with standard test method ASTM F-1249.

As used herein the term "transmittance" refers to the fraction of incident electromagnetic radiation at a given wavelength that passes through a film, measured as described in the experimental section.

Unless otherwise stated, the values of RH expressed as in-out % values refer to the humidity of the gas admixture in contact with one or with the other surface of the tested film. Typically the in surface is, if present, the sealant surface of the film.

In particular, for the OTR evaluation the nitrogen carrier gas with 0% of RH flows towards the seal surface (in surface) while the oxygen containing gas with 0% of RH is in contact with the other surface (out surface). This is also true for the evaluation of the $CO_2$ transmission rate.

In case of MVTR, water vapor (98% RH) is in contact with the sealant surface (in surface) while dried nitrogen (0% RH) flows towards the outer surface (out surface).

DETAILED DESCRIPTION OF INVENTION

Figure 1:
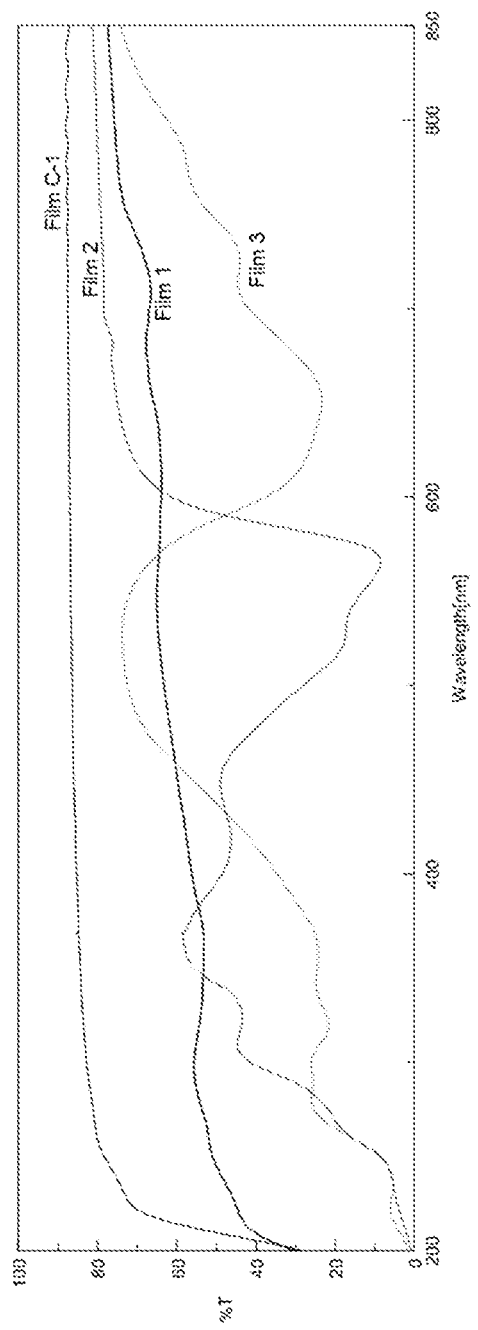
FIG. 1 represents transmittance at different wavelength values, expressed in nanometers, of Film C-1 and of Films 1-3, described in Example 1, measured as described in Example 2.

A first object of the present invention is the use of a sealable, optionally oriented, thermoplastic film having:
 an oxygen transmission rate between 8000 and 14000 cc/sqm·day·atm, preferably between 9000 and 13000 cc/sqm·day·atm, more preferably between 10000 and 13000 cc/sqm·day·atm, even more preferably between 11000 and 12000 cc/sqm·day·atm, even more preferably of 11500 cc/sqm·day·atm measured according to ASTM D-3985 at 23° C. and 0% in-0% out relative humidity,
 a $CO_2$ transmission rate between 25000 to 41000 cc/sqm·day·atm, preferably between 26000 and 40000 cc/sqm·day·atm, more preferably between 27000 and 39000 cc/sqm·day·atm, even more preferably of 28000 cc/sqm·day·atm, measured according to ASTM F-2476, at 23° C. and 0% in-0% out relative humidity,
 a water vapour transmission rate between 8 and 35 g/sqm·day·atm, more preferably between 20 and 30 g/sqm·day·atm, even more preferably of 26 g/sqm·day·atm, measured according to ASTM D1249 at 38° C. and 98% in-0% out relative humidity, and
 a transmittance of less than 70%, preferably less than 60% of light at wavelengths from 100 to 450 nm, preferably from 200 to 450 nm, more preferably from 200 to 400 nm, measured according to the method described in the experimental section,
for the packaging of fruits and/or vegetables.

Preferably, the film according to the invention is used for the packaging of fruits, more preferably for the packaging of fruits selected from the group consisting of bananas and mangoes.

The permeability properties of the film according to the invention may be obtained in various ways, for example by selecting appropriate composition, structure, thickness, orientation and production process of the film or by microperforating the film to form hollow channels spanning the whole thickness of the film (microperforations). The number and the dimension of the microperforations affect the gas permeability of the film. It must also be considered that, to shelter the packed fruits and vegetables from light, the dimensions of the microperforations have to be small enough to prevent light from passing through them and hit directly the products. The microperforations can have any shape, such as circle, square or diamond; typically, they have the shape of circle. Microperforation of the film can be done through any means known in the art and commonly used for this purpose, for example by laser beams or mechanical devices such as rolls equipped with needles. Microperforation is preferably done by laser beams. In an embodiment, the diameter of the microperforations is preferably comprised between 25 microns and 250 microns, more preferably comprised between 70 microns and 200 microns, even more preferably comprised between 50 microns and 150 microns. In the field of packaging films, equipment are known which microperforate a film on the basis of the desired permeability properties; an exemplary equipment is described in WO2011151305.

Preferably, in the film according to the invention the ratio between the $CO_2$ transmission rate (measured according to ASTM F-2476, at 23° C. and 0% in-0% out relative humidity) and the oxygen transmission rate (measured according to ASTM D-3985 at 23° C. and 0% in-0% out relative humidity) is between 2 and 3.8, more preferably between 2 and 3.6, even more preferably between 2.2 and 3.4.

Preferably, the film according to the invention has an oxygen transmission rate of 11500 cc/sqm·day·atm, a $CO_2$ transmission rate of 28000 cc/sqm·day·atm and a water vapour transmission rate of 26 g/sqm·day·atm, where the oxygen transmission rate, the $CO_2$ transmission rate and the water vapour transmission rate are measured as described above.

The film according to the present invention may be a mono or a multilayer film, preferably it is a multilayer film. Preferably, the multilayer film according to the invention comprises a number of layers between 2 and 4, more preferably of 3.

Preferably, the film according to the invention is heat sealable.

Preferably, the film according to the invention is oriented. The oriented film may be mono- or bi-axially oriented, preferably, it is bi-axially oriented.

Preferably, the film of the present invention is cross-linked. Preferably, all the layers of the film are cross-linked.

Preferably, the total thickness of the film is between 5 and 100, 90, 80, 70, 60, 50, 40, 30 or 20 microns, preferably between 5 and 20 microns, more preferably between 10 and 15 microns, more preferably between 12 and 14 microns, even more preferably it is of 13 microns. Preferably, the total thickness of the film is lower than 30, 20, 15 or 10 microns.

The film preferably comprises at least 50 wt % of a polyethylene, with respect to the total composition, preferably selected from linear low density polyethylene (LLDPE), low density polyethylene (LDPE), medium density polyethylene (MDPE) and mixtures thereof. Preferably, the film comprises an ethylene and vinyl acetate copolymer.

When the film has at least two layers, preferably, each of the outer layers of the film comprises at least 50 wt %, preferably between 60 and 90 wt %, more preferably between 70 and 80 wt %, even more preferably 75 wt % of a polyethylene.

Preferably, the polyethylene in the outer layers is selected from linear low density polyethylene (LLDPE) and medium density polyethylene (MDPE) and mixtures thereof. More preferably, said polyethylene is a mixture of LLDPE and MDPE, preferably in a weight ratio of 2:1. Furthermore, said outer layers of the film of the invention preferably further comprise an ethylene and vinyl acetate copolymer in an amount preferably between 15 and 35 wt %, more preferably between 20 and 30 wt %, even more preferably of about 24.5 wt %.

Preferably, the two outer layers of the film have identical composition and thickness.

When the film has more than two layers, preferably at least one of the inner layers of the film of the invention comprises at least 50 wt %, preferably at least 60 wt %, more preferably at least 70 wt %, even more preferably at least 80 wt %, more preferably between 80 and 99 wt %, more preferably between 90 and 98 wt %, even more preferably 97 wt % of a polyethylene. Preferably, the polyethylene in the inner layers is selected from linear low density polyethylene (LLDPE) and low density polyethylene (LDPE) and mixtures thereof. More preferably, said polyethylene is composed for at least 90 wt %, preferably at least 94 wt % of LLDPE.

Example of a suitable low density polyethylene (LLDPE) to be used in the film composition of the invention is for example Dowlex 2045S, commercialised by Dow (Density 0.9200 g/cm$^3$, Melt flow rate (190° C./2.16 Kg) 1.00 g/10 min; Melting point 124.0° C., Vicat softening point 103° C.).

Example of a suitable medium density polyethylene (MDPE) to be used in the film composition of the invention is for example Dowlex SC 2108G, commercialised by Dow (Density 0.935 g/cm$^3$, Melt flow rate (190° C./2.16 Kg) 2.6 g/10 min; Melting point 128° C., Vicat softening point 118° C.).

Example of a suitable ethylene and vinyl acetate copolymer is LD362BW by ExxonMobil (Density (23° C.) 0.9275 g/cm$^3$, Melt flow rate (190° C./2.16 Kg) 2 g/10 min; melting point 104° C.) or EF437AA by Westlake Chemical (Density 0.925 g/cm$^3$, Melt flow rate (190° C./2.16 Kg) 2 g/10 min).

Preferably, the film of the invention also comprises an antifog additive, for example a glycerol fatty acid ester such as Atmer 129 commercialised by Croda. When the film is multilayer, the antifog agent may be present in the outer and/or inner layers of the film. Preferably, the antifog additive is present in at least one inner layer.

The film of the invention may also comprise one or more antiblock additives, for examples silica, such as Superfine superfloss commercialized by Celite and/or Kemamide E Ultra Bead commercialized by PMC-Biogenix.

The film according to the invention may be heat shrinkable or not. When the film is heat shrinkable, preferably the film has a percentage of free shrink at 120° C. of at least 10%, 20%, 30%, 40% or 50% in longitudinal and/or in transverse direction, measured according to ASTM D2732. Preferably, the film of the invention has a free shrink not higher than 50%, 60%, 70% in longitudinal and/or in transverse direction. A particularly preferred film according to the invention has a free shrink at 120° C. of 60% in longitudinal direction and 65% in transverse direction. For the use in packaging fruits and vegetables according to the present invention, preferably the film is not heat shrinkable.

Preferably, the film according to the first object of the present invention can be manufactured by (co-)extrusion of the single or different layers of the films using either a flat or a circular film die that allows shaping the polymer melt into a thin film or tube, respectively.

Preferably, the film according to the present invention can be manufactured by the so-called double bubble process. According to said process, the multilayer film is co-extruded through a round die, to obtain a tube of molten polymeric material which is quenched immediately after extrusion without being expanded, then heated to a temperature which is above the Tg of all the resins employed and below the melting temperature of at least one of the resins employed, typically by passing it through a hot water bath, or alternatively by passing it through an IR oven or a hot air tunnel, and expanded, still at this temperature by internal air pressure, to get the transversal orientation, and by a differential speed of the pinch rolls which hold the thus obtained "trapped bubble", to provide the longitudinal orientation. After having been stretched, the film is quickly cooled while substantially retaining its stretched dimensions to somehow freeze the molecules of the film in their oriented state and rolled for further processing. An example of equipment suitable for this technique is disclosed by U.S. Pat. No. 4,841,605.

Alternatively, the multilayer film according to the present invention may be obtained by flat extrusion through a slot die, followed by optional orientation by heating the tape to its softening temperature but below its melt temperature and by stretching in the solid state with a simultaneous or a sequential Tenterframe process. The film is then rapidly cooled to somehow freeze the molecules of the film in their oriented state and wound.

The double bubble process is particularly preferred for the manufacturing of the film of the invention. The seamless tube produced can be directly further processed or converted into a flat film by slitting before being winded into rolls or being further processed.

A particularly preferred film according to the first object of the invention is a film comprising:
a first and second outer layer comprising between 40 and 60 wt %, preferably between 45 and 55 wt %, more preferably 50 wt % of a linear low density polyethylene, between 15 and 35 wt %, preferably between 20 and 30 wt %, more preferably 25 wt % of a medium density polyethylene, between 15 wt % and 35 wt %, preferably between 20 and 30 wt %, more preferably 24.5 wt % of ethylene-vinyl acetate (EVA).
an inner layer comprising between 80 and 97 wt %, preferably between 85 and 95 wt %, more preferably between 90 and 95 wt % of linear low density polyethylene and between 1 and 20 wt %, preferably between 1 and 10 wt %, more preferably between 1 and 5 wt %, even more preferably between 1 and 3% of low density polyethylene, wherein the total amount of polyethylene in the layer is at least 90 wt %, preferably at least 95 wt %.

Preferably, said particularly preferred film consists in the above three layers.

Preferably, in said particularly preferred film, the first and second outer layers have a thickness between 3 and 4 microns and said inner layer has a thickness between 6 and 8 microns.

The film according to the first object of the invention reduces the transmission of light at wavelengths between 100 and 450 nm (UV and blue-violet visible light), in particular at wavelengths between 200 and 450 nm, more in particular at wavelengths between 200 and 400 nm, thus protecting the fruits and vegetables packed in such film against quick ripening and undesired skin color changes.

The light transmittance properties of the film at the above wavelengths may be obtained in various ways, well known to the skilled man. Preferably, the film according to the invention comprises a pigment or a dye inside one or more of its layers or on one or both the surfaces of the outer layers.

For example, suitable pigments or dyes generally known in the art to provide the desired transmittance properties to films and food-approved may be added to the polymer composition of one or more layers of the film before preparing the film or applied on the surface of the preformed film by means of a printing process. Preferably, said pigments or dyes are selected from the group consisting of blue pigments or dyes, red pigments or dyes and green pigments or dyes. In an embodiment, the film of the invention is blue colored. In another embodiment, the film of the invention is red colored. In a further embodiment, the film of the invention is green colored.

In an embodiment, the film of the invention comprises a pigment or a dye inside one or more of its layers. Films where pigments or dyes are incorporated inside one or more layers thereof are generally referred to as "pigmented films". In order to make the extrusion process of pigmented films easier, pigments or dyes are typically added to a polymer resin or a polymer blend making up such one or more layers, in the form of a masterbatch. Blue pigments or dyes are preferably selected from CI Pigment Blue 60, 64, 66, 16 or 15, CI Direct Blue 86 or CI Solvent Blue 86, 97 or 67.

The pigments or dyes can be added, for example in a polyethylene, low density polyethylene, linear low density polyethylene blend and used to prepare a pigmented film, preferably a blue, red or green film. An example of suitable blend comprising a blue pigment able to provide the desired transmittance properties to the film is product 16103 commercialized by Ampacet, which is a LDPE/LLDPE mixture containing a blue pigment. Another suitable blend comprising a blue pigment is product 161159-U commercialized by Ampacet. Examples of suitable blends comprising a red pigment are product Remafin-Red PE33080765-ZT and product Remafin-Red PE3HDE12020, both commercialized by Clariant. Examples of suitable blends comprising a green pigment are product 174575 commercialized by Ampacet and product Remafin-Green PE63001823-ZN commercialized by Clariant.

In another embodiment, the pigment or dye is included in an ink, which is applied on one or both the surfaces of the preformed film through a printing process. Inks are typically a liquid or a paste and generally comprise, further to the pigments or dyes, solvents, resins, lubricants, solubilizers, surfactants, particulate matter, fluorescents, and other materials. In the context of the present invention, solvent-based inks are generally employed, where the solvents are typically ethyl acetate, isopropanol, ethoxypropanol or mixtures thereof.

Suitable printing process through which the ink can be applied on the surface(s) of the film are, for example, rotogravure or flexography. Films where pigments or dyes—contained in an ink—are applied on one or both the film surfaces are generally referred to as "printed films".

When the film of the invention is microperforated, and the pigment or dye is applied on the surface(s) of the film through a printing process, microperforation is preferably performed after printing. The printing process may in fact interfere with the microperforation, resulting in the microholes to clog up.

The film of the invention may also comprise a UV-blocker agent. Preferably, the UV-blocker agent is mixed with the pigments or dyes. Accordingly, the UV-blocker agent can be inside one or more of the layers of the film or applied on one or both the surfaces of the outer layers of the film. Example of suitable UV-blockers are products Chimassorb® or Uvinul® commercialized by Basf.

A second object of the invention is the use of a flexible container obtained by self-sealing a film according to the first object of the invention or by sealing two separate pieces of films according to the first object of the invention for packaging fruits and/or vegetables. Preferably, the flexible container according to the second object of the invention is used for packaging fruits, more preferably for packaging fruits selected from the group consisting of bananas and mangoes.

Preferably, the flexible container is in the form of a bag or a pouch.

Any conventional method for making bags and pouches known in the art may be readily adapted to make flexible containers from the film according to the present invention. The self-sealing of the film according to the present invention can be accomplished in a fin seal and/or lap seal mode. When the film is heat sealable, this is obtained preferably by having the heat sealable layer heat sealed to itself, i.e. in a fin seal mode.

The flexible container can be prepared in line, for example using automatic HFFS machine (flowpack) starting from a roll and preparing the single pouch just before being filled with the product to be packaged. Accordingly, a third object of the invention is a method for packaging fruits and/or vegetables comprising the following steps:
a) providing the film according to the present invention,
b) running the film through a former thus forming a tube,
c) inserting one or more fruits and/or vegetables into the tube,
d) sealing the tube longitudinally,
e) sealing and cutting the tube transversally at the beginning and at the end of the package.

When the film is heat sealable, sealing is preferably performed by heat sealing.

Alternatively, the bags or pouches may be pre-made.

The pre-made bag or pouch can be manufactured, for example, by folding a pre-cut film or by coupling at least two pre-cut films according to the present invention, by subsequently sealing said folded film on two sides or said coupled films on three sides, thus leaving a side of the pre-made bag or pouch open and ready to be filled in with the product to be packaged and, finally, to be closed by a last seal. The pre-made bag or pouch can be sealed according to seal or lap seal mode. When the film is heat sealable, sealing is preferably performed by heat sealing.

Accordingly, a fourth object of the invention is a method for packaging fruits and/or vegetables comprising the following steps:
a) introducing one or more fruits and/or vegetables in a flexible container as described above having an open side;
b) closing the open side of the container by sealing. When the film is heat sealable, sealing is preferably performed by heat sealing.

Optionally, between steps a) and b), an inert gas or a mixture of gas having a specific composition particularly suitable for the preservation of fruits and/or vegetables can be flushed into the packaging in order to further improve the shelf life of the packaged products.

The fruits and/or vegetables are preferably packed in the flexible container individually. However, also more than one fruits and/or vegetables may be packaged together in the flexible container according to the invention.

Preferably, the methods according to the third and fourth objects of the invention are for packaging fruits, more preferably for packaging fruits selected from the group consisting of bananas and mangoes.

As it will be demonstrated in the experimental section, fruits and vegetables packaged in bags or pouches made with the film of the invention are characterized by a significantly increased shelf life compared to unpackaged products or products packaged in films having different light transmittance and/or permeability properties.

In order to obtain the maximum extension of shelf life, preferably the fruits and/or vegetables are packed in the film or flexible container when still not completely ripe.

A fifth object of the invention is a package comprising a film or flexible container according to the present invention and one or more fruits and/or vegetables packaged in said film or flexible container.

In an embodiment, the package can further comprise a rigid support such as a sheet or a tray. Preferably, such support can be a cardboard sheet or tray.

In an embodiment, the package can further comprise ethylene absorbers and/or ethylene blockers. Both ethylene absorbers and ethylene blockers allow to reduce the ethylene concentrations in the sealed package, thus slowing down maturation/senescence of the packaged products. Ethylene absorbers are chemicals that react with ethylene, which is thus removed and does not accumulate within the package. Ethylene blockers are chemicals which behave as ethylene antagonists, binding to the ethylene receptors of the product and triggering a negative feedback process which stops the production of ethylene by the product itself. Both ethylene absorbers and ethylene blockers are known in the art and commonly used to reduce ethylene content in packaged products. They are generally provided in the form of granules or powder contained in sachets, filters or soaked in films or pads. Typical examples of ethylene absorbers are mixtures of zeolites or clay and oxidizing agents (such as potassium permanganate), like the products commercialized by Retarder. A typical example of ethylene blockers is 1-methylcyclopropene.

EXAMPLES

The present invention can be further understood by reference to the following examples that are merely illustrative and are not to be interpreted as a limitation to the scope of the present invention that is defined by the appended claims.

In the following examples, films made from the ingredients indicated in Table 1 below have been employed:

TABLE 1

| TRADENAME | SUPPLIER | Chemical nature | ACRONYM | Properties and parameters |
|---|---|---|---|---|
| SYLOBLOC 47 | GRACE Davison | AntiBlock Silica-Amorphous | Additive3 | Density 2.100 g/cm$^3$ |
| ATMER 129 | Croda | AntiFog Glycerol Fatty Acid Ester | Additive4 | Density 0.92 g/cm$^3$, melting point 69° C. |
| Loxiol LS3 DEO N | Emery Oleochemicals | AntiFog Ethoxylated Fatty Alcohol | Additive5 | Density (23° C.) 0.830 g/cm$^3$ |
| LD362BW | ExxonMobil | Ethylene Vinyl Acetate Copolymer with 4.5% comonomer content | EVA2 | Density (23° C.) 0.9275 g/cm$^3$, Melt flow rate (190° C./2.16 Kg) 2 g/10 min; melting point 104° C. |
| TN2006 | Braskem | Ethylene Vinyl Acetate Copolymer with 18% comonomer content | EVA3 | Density 0.940 g/cm$^3$, Melt flow rate (190° C./2.16 Kg) 0, 7 g/10 min; Melting point 90° C., Vicat softening point 70° C. |

TABLE 1-continued

| TRADENAME | SUPPLIER | Chemical nature | ACRONYM | Properties and parameters |
|---|---|---|---|---|
| 1003 VN 4 | Total Petrochemicals | Ethylene Vinyl Acetate Copolymer with 13, 5% comonomer content | EVA4 | Density 0.935 g/cm$^3$, Melt flow rate (190° C./2.16 Kg) 0, 38 g/10 min; melting point 93° C. |
| DOWLEX SC 2108G | DOW | MDPE | MDPE | Density 0.935 g/cm$^3$, Melt flow rate (190° C./2.16 Kg) 2.6 g/10 min; Melting point 128° C., Vicat softening point 118° C. |
| DOWLEX 2045S | DOW | LLDPE Ethylene-1-octene copolymer | LLDPE1 | Density 0.920 g/cm$^3$, Melt flow rate (190° C./2.16 Kg) 1.00 g/10 min; Melting point 124.0° C., Vicat softening point 103° C. |
| AF5841LL | TOSAF | LLDPE with antifog additive | LLDPE2 | Density 0.920 g/cm$^3$, Melt flow rate (190° C./2.16 Kg) 3.0 g/10 min |
| Eltex PF6220AA | Ineos | LLDPE | LLDPE3 | Density 0.919 g/cm$^3$, Melt flow rate (190° C./2.16 Kg) 2.1 g/10 min |
| 16103 | Ampacet | LDPE/LLDPE mixture with 52% ash and blue pigment | Blue in LDPE/LLDPE | Density 1.5 g/cm$^3$, Melt flow rate (190° C./2.16 Kg) 16 g/10 min |
| CESA-PROCESS PEA0050633-BN | Clariant | LDPE | LDPE | Density 0.925 g/cm$^3$, Melt flow rate (190° C./2.16 Kg) 2.1 g/10 min |
| AFFINITY PL 1281G1 | DOW | VLDPE with slip and antioxidant additives 13% comonomer (octene) | VLDPE1 | Density 0.9001 g/cm$^3$, Melt flow rate (190° C./2.16 Kg) 6 g/10 min |
| QUE0 1007 | Borealis | VLDPE | VLDPE2 | Density 0.910 g/cm$^3$, Melt flow rate (190° C./2.16 Kg). 6.6 g/10 min, Melting point 105° C., Viscosity 88 mPa · sec |
| AFFINITY PL 1880G | DOW | VLDPE | VLDPE3 | Density 0.902 g/cm$^3$, Melt flow rate (190° C./2.16 Kg) 1.1 g/10 min, Melting point 99° C., Vicat Softening point 86° C. |
| AFFINITY PL 1850G | DOW | VLDPE with 12% Comonomer content | VLDPE4 | Density 0.902 g/cm$^3$, Melt flow rate (200° C./2.16 Kg) 3 g/10 min, Melting point 97° C., Vicat Softening point 85° C. |
| NUCREL 1202 | DuPont | Copolymer of ethylene and methacrylic acid, with 12% comonomer content | EMAA | Density 0.94 g/cm$^3$, Melt flow rate (190° C./2.16 Kg) 1.5g/10 min, Melting point 99° C., Vicat Softening point 75° C. |
| IXAN PV910 | SolVin | Polyvinylidene chloride/methyl acrylate | PVDC-MA | Density 1.71 g/cm$^3$, Viscosity solution 1.46 mPa · sec |
| ADMER NF927E | Mitsui Chemical | Maleic Anhydride-Modified Linear LLDPE | LLDPE-md1 | Density 0.915 g/cm$^3$, Melt flow rate (190° C./2.16 Kg) 1.3 g/10 min, Vicat Softening point 72° C. |

TABLE 1-continued

| TRADENAME | SUPPLIER | Chemical nature | ACRONYM | Properties and parameters |
|---|---|---|---|---|
| BYNEL 4104 (2006) | DuPont | Maleic Anhydride-Modified Ethylene/Butene Copolymer | LLDPE-md2 | Density 0.930 g/cm$^3$, Melt flow rate (190° C./2.16 Kg) 1.10 g/10 min, Melting point 125° C., Vicat Softening point 110° C. |
| SOARNOL AT4403 | Nippon Gohsei | Ethylene vinyl-alcohol copolymers with 44% comonomer content (Ethylene) | EVOH/EVAL | Crystallization point 144° C., Density 1.140 g/cm$^3$, Melt flow rate (at 210° C., 2.16 kg) 3.5 g/10 min, Melting point 164° C. |
| GRILON CF6S | EMS-Grivory | Copolyamide | PA-6\12 | Density 1.050 g/cm$^3$, Melt flow rate (190° C., 5 Kg) 5.75 g/10 min, Melt Volume Index (275° C., 5 Kg) 195 ml/10 min, Melting point 130° C., Relative Viscosity 1.80 |
| GN001 | Eastman Chemical | Polyethylene Terephthalate/Glycol | PETG1 | Density 1.27 g/cm$^3$, Glass Transition 78° C., Viscosity Intrinsic 0.75 dl/g |
| SUKANO G dc S503 | Sukano | AntiBlock and Slip in Polyethylene Terephthalate/Glycol | PETG2 | Density 1.4 g/cm$^3$, Moisture Content max 0, 5%, Vicat softening point 82° C. |
| RAMAPET N180 | Indorama | Polyethylene Terephthalate | PET | Density 1.4 g/cm$^3$, Glass Transition 78° C., Melting Point 245° C., Viscosity Solution 0.80 mPa · sec |

Example 1

The following Film 1 according to the invention was prepared having the composition in layers indicated in Table 2 below:

TABLE 2

| Film | Layer | Thickness (microns) | Layer composition |
|---|---|---|---|
| Film 1 | Layer 1 | 3.3 | 10.00% MB2 (98, 20% EVA2, 1, 80% Additive3); 15.00% EVA2; 25.00% MDPE; 50.00% LLDPE1 |
| | Layer 2 | 6.5 | 94% LLDPE1, 1.00% Additive4, 2.00% Additive5, 3% Blue in LDPE/LLDPE. |
| | Layer 3 | 3.3 | 10.00% MB2 (98, 20% EVA2, 1, 80% Additive3) 15.00% EVA2; 25.00% MDPE; 50.00% LLDPE1 |

Film 2 and Film 3 according to the invention were also prepared: their composition in layers is the same as Film 1 above. The free surface of outer layer 3 (i.e the surface which is not adhered to layer 2) was printed with an ink containing a red pigment or a green pigment, respectively, as described in detail below.

As comparative examples, commercial films C-1, C-2, C-3 or C-4, having the composition set out in Table 3, were used.

TABLE 3

| Film C-1 | Layer 1 | 3.3 | 10.00% MB2 (98, 20% EVA2, 1, 80% Additive3); 15.00% EVA2; 25.00% MDPE; 50.00% LLDPE1 |
|---|---|---|---|
| | Layer 2 | 6.5 | 1.00% Additive4, 2.00% Additive5, 97.00% LLDPE1 |
| | Layer 3 | 3.3 | 10.00% MB2 (98, 20% EVA2, 1, 80% Additive3) 15.00% EVA2; 25.00% MDPE; 50.00% LLDPE1 |
| Film C-2 | Layer 1 | 9 | 80.00% VLDPE1; 20.00% VLDPE2 |
| | Layer 2 | 12.8 | 60.00% VLDPE3; 40.00% EMAA |
| | Layer 3 | 6.8 | 100.00% EVA3 |
| | Layer 4 | 4.6 | 100.00% PVDC-MA |
| | Layer 5 | 3.8 | 100.00% EVA3 |
| | Layer 6 | 8.2 | 70.00% VLDPE4; 30.00% EVA4 |
| Film C-3 | Layer 1 | 7.1 | 75.00% LLDPE3, 25.00% LLDPE2 |
| | Layer 2 | 2.2 | 100.00% LLDPE-md1 |
| | Layer 3 | 2.5 | 95.00% EVOH/EVAL, 5.00% PA-6\12 |
| | Layer 4 | 2.2 | 100.00% LLDPE-md1 |
| | Layer 5 | 7.1 | 75.00% LLDPE3, 25.00% LLDPE2 |
| Film C-4 | Layer 1 | 2.5 | 58.00% PETG1, 16.00% LLDPE-md2, 24% PET, 2.00% LDPE |
| | Layer 2 | 24 | 50.00% PET, 50.00% PETG1, |
| | Layer 3 | 6.5 | 98.00% PET, 2.00% PETG2 |

Further comparative examples are the colored films C-5 and C-6, commercially available from Creativ Company. They are polyethylene-based films having a colored (blue or red, respectively) polyamide coating. The polyamide coating provides a gas barrier effect, so the gas permeability of Films C-5 and C-6 is lower than the films of the invention, as will be shown below. The thickness of Films C-5 and C-6 is 26 μm.

The layer sequences of Film 1 and of C-1 were extruded on a double bubble line through a round die at 205° C. and at a speed of 28 m/min, cooled at 8° C. and cross linked at 37 KGrays. The obtained tape was then pre-heated by an infrared oven at 100° C., passed through horizontal and vertical ovens heated by steam at 105° C. and air at 134° C., biaxially oriented with stretching ratios of 5.4 in longitudinal direction and 4.9 in transversal direction and stabilized by air rings at 26° C.

Film 2 and Film 3 were manufactured starting from Film 1. In details, samples of Film 1 having dimensions about 210×300 mm were corona treated to increase the surface tension of the film and improve ink adhesion.

The off-line device MINI CORONA TREATER by Boussey Control Europe, set at 22 kV (medium voltage power of the instrument), was used. The treatment time was 0.25 sec from 1 cm of distance from the film.

The corona treated samples were then manually printed on the free surface of outer layer 3 (i.e the surface which is not adhered to layer 2) using the RESOURCE 1 instrument by Resource Color Technology Inc., Jamesburg, N.J., equipped with rod n. 16.

The red ink used was 907445815:RED B420 SANP SAC, supplied by SunChemical. The green ink used was 907446041 GREEN B720 SUNPROP SAC, supplied by SunChemical. The inks as received by the supplier were diluted 1:25 w/w with ethyl acetate.

10 ml of diluted ink were manually dropped from a Pasteur pipette on each film sample in front of the rod, distributing the ink along the whole width of the sample.

The rod was allowed to roll and spread the ink on the whole area of the film sample. Printed samples were let to dry at room temperature.

Light transmittance of the printed samples was evaluated as described in Example 2 and the results are as shown in FIG. 1.

The layer sequence of Film C-2 was prepared by extrusion coating through a round die. In details, a substrate formed by layers 1 to 3 wherein the heat-sealing layer (layer 1) is the innermost layer of the tube, was co-extruded, quickly quenched with a water cascade, irradiated at a dosage level of 64 kGrays and coated with the sequence of three layers (layer 4 to 6) wherein layer 6 is the outermost layer of the overall tube. The extrusion coated tape was then quenched, re-heated by passing it through a water bath at about 95-98° C., and oriented at this temperature (with orientation ratios of about 3.7:1 in the longitudinal direction and about 4.0:1 in the transverse direction) by the trapped-bubble process.

The layer sequence of Film C-3 was extruded through a round die, quickly quenched at a quenching temperature of 20° C., setting a distance of 10 cm between the die exit and the forming shoe, irradiated at 65 KGrays, biaxially oriented out of hot air at the orientation temperature of 113° C., with stretching ratios of 3.7:1 in both directions, annealed for 3.5 seconds at 70° C., allowing a reduction of the film width in TD of 10%. The film was then cooled at 20° C. The annealing step was carried out on a processing unit as illustrated in FIG. 1 of WO2011029950 consisting of a sequence of six stainless steel Gross Equatherm heated rollers and two cooled rollers, 16-cm in diameter and 203-cm in length, disposed in such a way that the total heating time for the film passing through and contacting the various heated rollers was about 3.5 seconds. The temperature (70° C.) was the same in the three heating zones.

The layer sequence of Film C-4 was manufactured through a Flat Coextrusion process followed by in-line simultaneous Tenterframe orientation. Main operating conditions used to stretch and heat-set the films were:
MD ratio: 3.6:1;
TD ratio: 3.6:1;
Pre-heating temperature: 98° C.;
Stretching Temperature: 98° C.;
Heat-setting Temperature: 210° C.

The film so obtained was cooled down first by an air flow at 30° C. and then by passing onto a cooling roll that was cooled with water and kept at 20° C.

Example 2

Permeability properties of all the films were measured.
Oxygen Transmission Rate (OTR) measurement was performed according to standard test method ASTM D-3985, under the conditions already described in the description.

$CO_2$ permeability measurement was performed according to standard test method ASTM F-2476, under the conditions already described above in the description.

Moisture Vapor Transmission Rate (MVTR) measurement was performed according to standard test method ASTM F-1249, under the conditions already described in the description.

The properties of all the films tested are reported in the Table 4 below:

TABLE 4

| Film | OTR 23° C., 0% in-0% out RH (cc/sqm · day · atm) | $CO_2$ permeability at 23° C., 0% in-0% out RH (cc/sqm · day · atm) | MVTR at 38° C., 98% in-0% out relative humidity (g/sqm · day · atm) |
|---|---|---|---|
| Film 1 | 11500 | 28000 | 26 |
| C-1 | 12000 | 28000 | 26 |
| C-2 | 17 | 50 | 7 |
| C-3 | 25 | 100 | 25 |
| C-4 | 60 | 50 | 7 |
| C-5 | 1500 | n.a. | 5.1 |
| C-6 | 1300 | n.a. | 5.3 |

Permeability properties (OTR, $CO_2$ permeability and MVTR) were measured also for Film 2 and Film 3 and resulted to be in line with the values obtained for Film 1.

Also, light transmittance properties of film C-1 and Films 1-3 were measured using a Jasco V-550 spectrophotometer equipped with a light source deuterium lamp (190-350 nm) and a halogen lamp (330-900 nm).

In details, pieces of 3 cm×1.7 cm of the films to be tested were cut from portions of the film spaced one from the other, along the transverse direction of the roll, and put into the sample holder of the instrument. Ten specimens have been tested per each of the films tested.

The light wavelength range tested was 200-850 nm, under the following conditions:
resolution of 0.5 nm
response: medium
scanning speed: 100 nm/min
baseline flatness±0.004 Abs
band width: 2 nm
photometric mode: absorbance. The instrument measures absorbance, which is then converted by an integrated software into % Transmittance.

Ten curves were obtained for each of the films tested, which were substantially superimposed.

FIG. 1 shows one exemplary curve obtained for the films tested.

As can be seen in FIG. 1, Film 1, Film 2 and Film 3 have less than 60% transmittance of light at wavelengths between 200 and 450 nm while Film C-1 has a much higher transmittance in the above wavelength interval. In particular, Film 3 (green colored film) is the one with the lowest transmittance of light in the wavelength interval between about 300 and about 430 nm.

Example 3

The above described films were used to prepare bags (hand made on a manual sealing device, seals were performed leaving an open end for the product manual loading). The above bags were then tested for their effect on shelf life of bananas and mangoes.

Example 3.1

Bananas, belonging to class Extra and having a size of about 21 cm, were purchased when still green.

The different bags described above were used to pack a single banana and the open end was sealed. No gases have been inserted in the package during this operation, that has been performed in air.

The bananas were stored at 20° C. for 9 days after packaging. As a control, unpacked bananas were stored under the same conditions. The external aspect of packed and unpacked bananas was monitored visually 2, 4, 5, 6, 7, 8 and 9 days after packaging. These times courses are indicated in the following as DOP2, DOP4, DOP5, DOP6, DOP7, DOP8 and DOP9, respectively, where DOP means day of packaging. At DOP8 or DOP9, the bananas were dissected and their transversal section was analyzed.

The results of the observations at different time courses are summarized in the Table 5 below. The comments are based on an average of several observed fruits.

TABLE 5

| Packaging film | Peel appearance DOP2 | Peel appearance DOP4 | Peel appearance DOP5 | Peel appearance DOP6 | Peel appearance DOP7 | Peel appearance DOP8 | Transversal Section DOP8 | Peel appearance DOP9 | Transversal Section DOP9 |
|---|---|---|---|---|---|---|---|---|---|
| Film 1 | Yellow | n.a. | Yellow | Yellow | Yellow | Yellow | n.a. | Yellow | Commercially acceptable appearance |
| Film 2 | n.a. | n.a. | Yellow | Yellow | Yellow | n.a. | n.a. | Yellow | Commercially acceptable appearance |
| Film 3 | n.a. | n.a. | Yellow | Yellow | Yellow | n.a. | n.a. | Yellow | Commercially acceptable appearance |
| C-1 film | Yellow | n.a. | Yellow | Yellow | Starting brown flecks | Many brown flecks | n.a. | Brown coloration on about 30% of the surface | Unacceptable |
| C-2 film | Yellow | n.a. | Starting brown flecks and unacceptable texture (too soft) | n.a. | n.a. | n.a. | n.a. | n.a. | n.a. |
| C-3 film | Yellow | n.a. | Starting brown flecks and unacceptable texture (too soft) | n.a. | n.a. | n.a. | n.a. | n.a. | n.a. |
| C-4 film | Yellow | n.a. | Yellow | n.a. | n.a. | Starting brown flecks | n.a. | Brown coloration on more than 50% surface | Unacceptable |
| C-5 film | n.a. | Yellow | Yellow but unacceptable texture (too soft) | n.a. | n.a. | Brown flecks | Unacceptable | n.a. | n.a. |
| C-6 film | n.a. | Yellow | Yellow but unacceptable texture (too soft) | n.a. | n.a. | Many brown flecks | Unacceptable | n.a. | n.a. |
| Unpacked | Yellow | n.a. | Yellow with brown flecks | Yellow with brown flecks | Brown coloration on more than 50% surface | Brown coloration on more than 50% surface | n.a. | Brown coloration on more than 50% surface | Unacceptable |

The obtained results demonstrate that while the unpacked bananas start to show brown flecks on the peel from DOP5, bananas packed in Film 1 of the invention maintain a yellow peel up to 9 days after packaging. Furthermore, the inner part of bananas packed in Film 1 after 9 days of storage still has a commercially acceptable appearance with a clearer pulp and a thicker skin. Also bananas packed in Film 2 and Film 3 of the invention maintain a yellow peel up to 9 days after packaging and their inner part has a commercially acceptable appearance after 9 days of storage.

Bananas unpacked or packed in packaging films different from the films of the invention have a shorter shelf life. Bananas packed in films with gas barrier properties are commercially unacceptable after 5 days of storage (DOP5), because of a too soft pulp texture. In particular, the pulp of bananas packaged in Films C-5 and C-6 is unacceptably soft, while the external appearance of the fruits is good (yellow peel). In fact C-5 and C-6, being colored, sheltered bananas from light, avoiding flecks formation, but prevented them from exchanging moisture vapor with the environment, which results in a softening of the fruit pulp.

Figure 2:
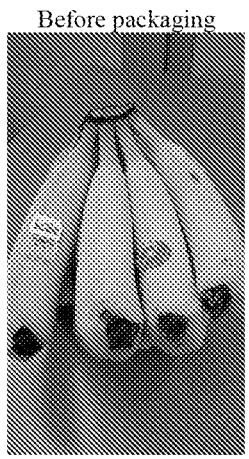
FIGS. 2-4 represent bananas before packaging (FIG. 2), 5 days after packaging (DOP5, FIG. 3) and 8 days after packaging (DOP8, FIG. 4), packed in Film 1 (A), Film C-1 (B) or unpacked (C), as described in Example 3.1.
Figure 3:
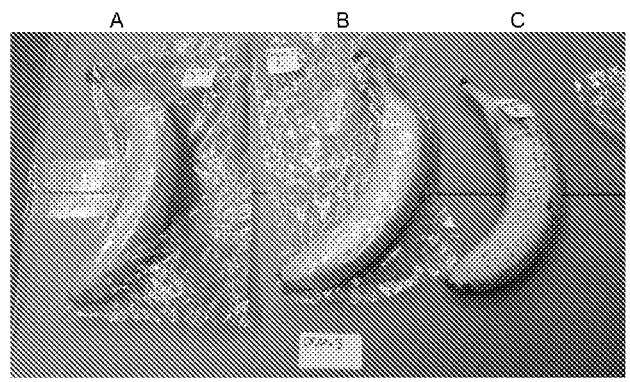
Figure 4:
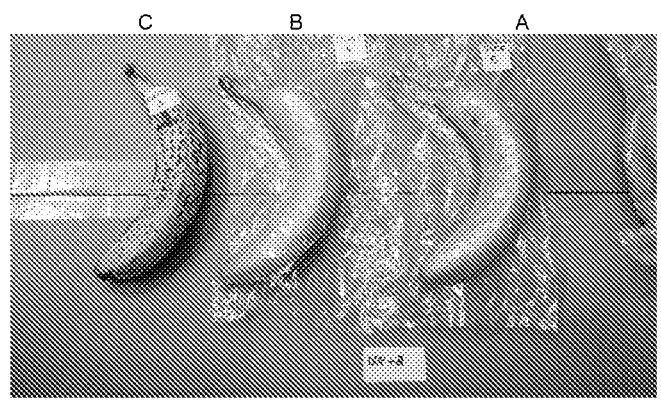
Figure 5:
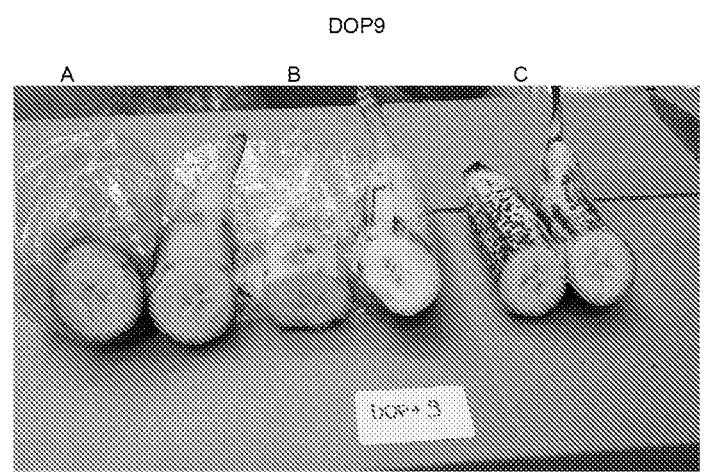
FIG. 5 represents the transversal section of bananas 9 days after packaging (DOP9), packed in Film 1 (A), Film C-1 (B) or unpacked (C), as described in Example 3.1. DOP: day of packaging.

The effect of the Films of the invention on the shelf life of bananas is apparent also from FIG. 2, that shows peel appearance before packaging (FIG. 2), at DOP5 (FIG. 3) and at DOP8 (FIG. 4) and transverse section at DOP9 (FIG. 5) of a banana packed in Film 1 compared to an unpacked banana or a banana packed in film C-1.

Figure 6:
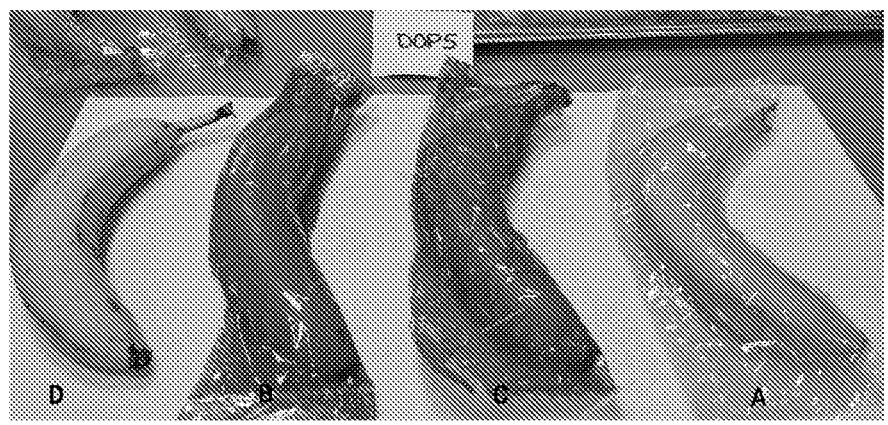
FIGS. 6-7 represent bananas 5 days after packaging (DOP5, FIG. 6) and 9 days after packaging (DOP9, FIG. 7), packed in Film 1 (A), Film 2 (B), Film 3 (C) or unpacked (D), as described in Example 3.1. DOP: day of packaging.
Figure 7:
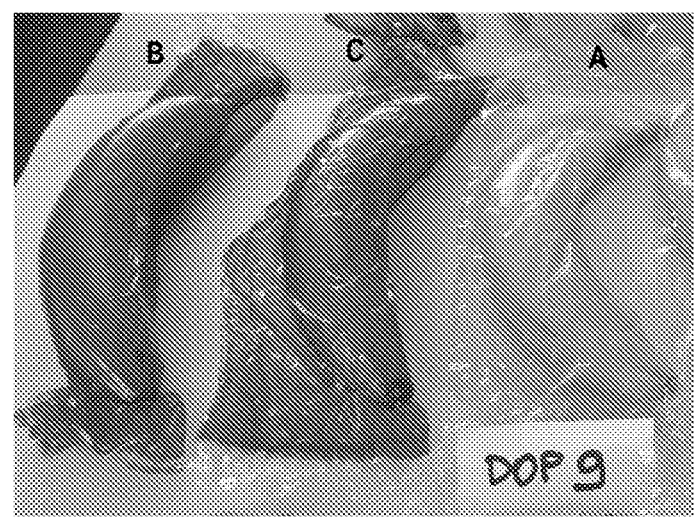

FIGS. 6-7 show peel appearance at DOP5 (FIG. 6) and at DOP9 (FIG. 7) of a banana packed in Film 1, a banana packed in Film 2 and a banana packed in Film 3, compared to an unpacked banana.

Figure 8:
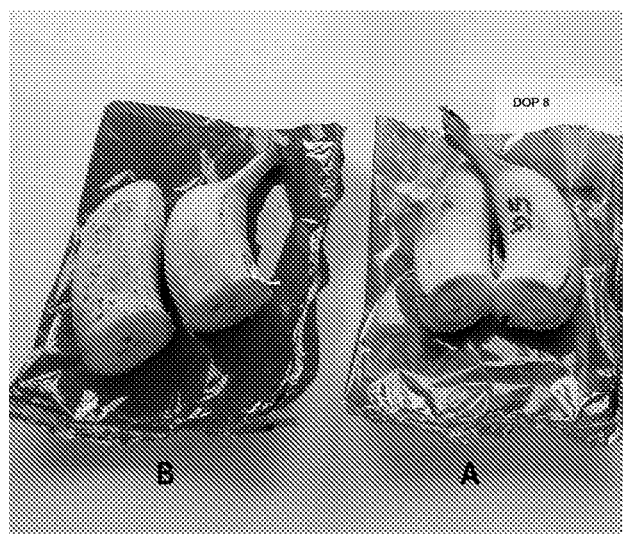
FIG. 8 represents the transversal section of bananas 8 days after packaging (DOP8), packed in film C-5 (A) or in film C-6 (B). DOP: day of packaging.

FIG. 8 shows transverse section at DOP8 of a banana packed in film C-5 and a banana packed in film C-6: the pulp appearance is not compact, with some brown areas.

Example 3.2

Mangoes having a size of about 10-14 cm were purchased when still green.

The bags described above made with Film 1 of the invention and with comparative film C-1 were used to pack a single mango and the open end was sealed. No gases have been inserted in the package during this operation, that has been performed in air.

The mangoes were stored at 20° C. for 11 days. As a control, unpacked mangoes were stored under the same conditions. The external aspect of packed and unpacked mangoes was monitored visually 3 and 11 days after packaging. These times courses are indicated in the following as DOP3 and DOP11, respectively, where DOP means day of packaging.

The results of the observations at different time courses are summarized in the Table 6 below. The comments are based on an average of several observed fruits.

TABLE 6

| Packaging film | Peel appearance DOP3 | Peel appearance DOP11 |
|---|---|---|
| Film 1 | green | green |
| C-1 | green | green/red |
| Unpacked | green | yellow/red |

The obtained results demonstrate that the mangoes packed in Film 1 of the invention are still unripe after 11 days of storage (DOP11), as demonstrated by their green peel. The unpacked mangoes and the mangoes packed in film C-1 instead are quite ripe at DOP11, showing a peel color typical of a ripening fruit (in particular, unpacked mangoes are riper than mangoes packed in C-1).

Furthermore, the pulp of mangoes packed in Film 1 after 11 days of storage is compact and solid. Mangoes packed in Film C-1 and unpacked mangoes instead have a softer pulp coherently with a more advanced ripening stage. In particular, the pulp of unpacked mangoes is even softer than the pulp of mangoes packed in C-1.

Figure 9:
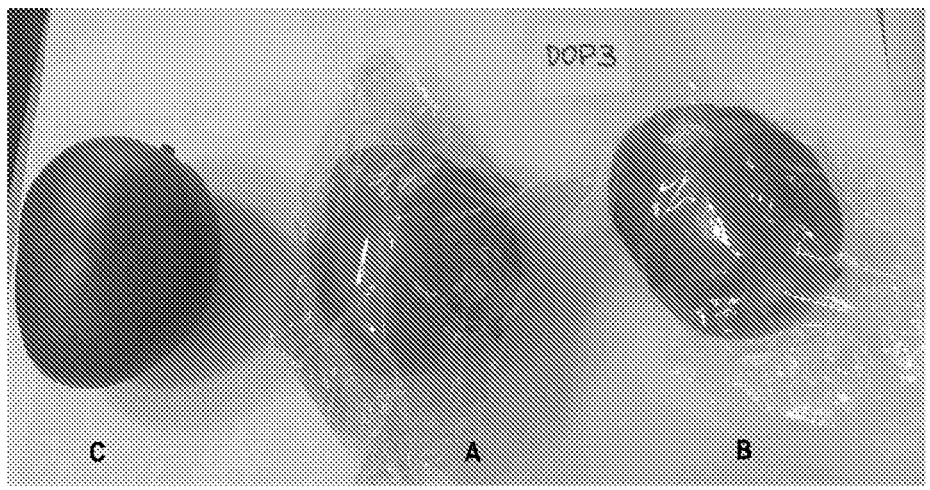
FIG. 9-10 represent mangoes 3 days after packaging (DOP3, FIG. 9) and 11 days after packaging (DOP11, FIG. 10), packed in Film 1 (A), Film C-1 (B) or unpacked (C), as described in Example 3.2. DOP: day of packaging.
Figure 10:
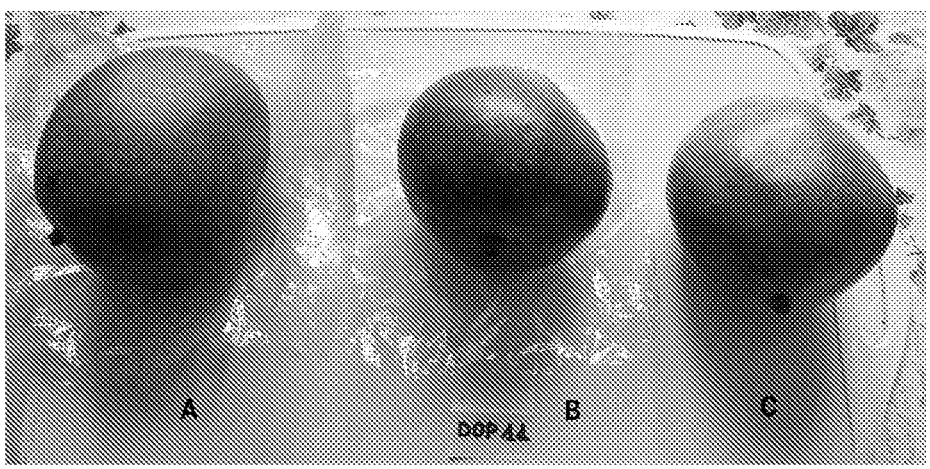

The effect of the films of the invention on the shelf life of mangoes is apparent also from FIGS. 9-10, that show peel appearance at DOP3 (FIG. 9) and at DOP11 (FIG. 10) of a mango packed in Film 1, compared to an unpacked mango or a mango packed in film C-1.

The invention claimed is:

1. A sealable, thermoplastic film for the packaging of fruits or vegetables comprising:
    a) a first outer layer comprising between 40 and 60 wt % of a linear low density polyethylene, between 15 and 35 wt % of a medium density polyethylene, and between 15 wt % and 35 wt % of an ethylene-vinyl acetate copolymer, all wt % being based on the weight of the first outer layer;
    b) a second outer layer comprising between 40 and 60 wt % of a linear low density polyethylene, between 15 and 35 wt % of a medium density polyethylene, and between 15 wt % and 35 wt % of an ethylene-vinyl acetate copolymer, all wt % being based on the weight of the second outer layer; and
    c) an inner layer comprising between 80 and 97 wt % of a linear low density polyethylene and between 1 and 20 wt % of a low density polyethylene, wherein the total amount of polyethylene in the inner layer is at least 90 wt %, all wt % being based on the weight of the inner layer;
    the thermoplastic film having:
    an oxygen transmission rate between 8000 and 14000 cc/sqm·day·atm, measured according to ASTM D-3985 at 23° C. and 0% in-0% out relative humidity,
    a $CO_2$ transmission rate between 25000 to 41000 cc/sqm·day·atm, measured according to ASTM F-2476, at 23° C. and 0% in-0% out relative humidity,
    a water vapour transmission rate between 8 and 35 g/sqm·day·atm, measured according to ASTM D1249 at 38° C. and 98% in-0% out relative humidity,
    a transmittance of less than 70% of light at wavelengths from the entirety of 200 to 400 nm, measured with the method as follows:
    3 cm×1.7 cm pieces of film cut from portions of the film along a transverse direction are put into sample holders of a spectrophotometer equipped with a light source deuterium lamp (190-350 nm) and a halogen lamp (330-900 nm)
    the spectrophotometer set to have a light wavelength range being 200-850 nm, under the following conditions:
    resolution of 0.5 nm
    response: medium
    scanning speed: 100 nm/min
    baseline flatness ±0.004 Abs
    band width: 2 nm
    photometric mode: absorbance
    the instrument measured absorbance is converted by an integrated software into % transmittance.
2. The thermoplastic film according to claim 1, wherein the film has a ratio between the $CO_2$ transmission rate (measured according to ASTM F-2476, at 23° C. and 0% in-0% out relative humidity) and the oxygen transmission rate (measured according to ASTM D-3985 at 23° C. and 0% in-0% out relative humidity) between 2 and 3.8.

3. The thermoplastic film according to claim 1, wherein the film is heat sealable.

4. The thermoplastic film according to claim 1, where the film is cross linked, oriented or heat shrinkable.

5. The thermoplastic film according to claim 1 wherein the film is a multilayer film, comprising a number of layers between 3 and 4.

6. The thermoplastic film according to claim 1, wherein the total thickness of the film is between 5 and 20 microns.

7. The thermoplastic film according to claim 1, wherein the film comprises between 60 and 90 wt % of a polyethylene, selected from linear low density polyethylene (LLDPE), low density polyethylene (LDPE), medium density polyethylene (MDPE) and mixtures thereof.

8. The thermoplastic film according to claim 1, wherein the film is blue coloured, red coloured or green coloured and comprises a blue, red, or green pigment or a blue, red, or green dye inside one or more layers of the film or applied on one or both the surfaces of an outer layers of the film.

9. The thermoplastic film according to claim 1, wherein the film is microperforated, wherein the diameter of the microperforations is comprised between 25 microns and 250 microns.

10. The thermoplastic film according to claim 1 formed into a flexible container by self-sealing the thermoplastic film or by sealing two separate pieces of the thermoplastic film to form a package for packaging fruits and/or vegetables.

11. The thermoplastic film according to claim 10, wherein the flexible container is in the form of a pouch or bag.

12. Method for packaging fruits and/or vegetables comprising the following steps:
   a) providing a sealable thermoplastic film comprising:
      i. a first outer layer comprising between 40 and 60 wt % of a linear low density polyethylene, between 15 and 35 wt % of a medium density polyethylene, and between 15 wt % and 35 wt % of an ethylene-vinyl acetate copolymer, all wt % being based on the weight of the first outer layer;
      ii. a second outer layer comprising between 40 and 60 wt % of a linear low density polyethylene, between 15 and 35 wt % of a medium density polyethylene, and between 15 wt % and 35 wt % of an ethylene-vinyl acetate copolymer, all wt % being based on the weight of the second outer layer; and
      iii. an inner layer comprising between 80 and 97 wt % of a linear low density polyethylene and between 1 and 20 wt % of a low density polyethylene, wherein the total amount of polyethylene in the inner layer is at least 90 wt %, all wt % being based on the weight of the inner layer;
   the thermoplastic film having:
   an oxygen transmission rate between 8000 and 14000 cc/sqm·day·atm, measured according to ASTM D-3985 at 23° C. and 0% in-0% out relative humidity,
   a $CO_2$ transmission rate between 25000 to 41000 cc/sqm·day·atm, measured according to ASTM F-2476, at 23° C. and 0% in-0% out relative humidity,
   a water vapour transmission rate between 8 and 35 g/sqm·day·atm, measured according to ASTM D1249 at 38° C. and 98% in-0% out relative humidity, and
   a transmittance of less than 70% of light at wavelengths from the entirety of 200 to 400 nm, measured with the method as follows:
   3 cm×1.7 cm pieces of film cut from portions of the film along a transverse direction are put into sample holders of a spectrophotometer equipped with a light source of a deuterium lamp (190-350 nm) and a halogen lamp (330-900 nm)
   the spectrophotometer set to have a light wavelength range being 200-850 nm, under the following conditions:
   resolution of 0.5 nm
   response: medium
   scanning speed: 100 nm/min
   baseline flatness ±0.004 Abs
   band width: 2 nm
   photometric mode: absorbance
      the instrument measured absorbance is converted by an integrated software into % transmittance,
   b) running the film through a former thus forming a tube,
   c) inserting one or more fruits and/or vegetables into the tube,
   d) sealing the tube longitudinally forming a package,
   e) sealing and cutting the tube transversally at the beginning and at the end of the package.

13. The method for packaging fruits and/or vegetables according to claim 12, further comprising the following step of flushing an inert gas or a mixture of gases into the packaging between steps c) and e).

14. The method according to claim 12 for packaging fruits selected from the group consisting of bananas and mangoes.

15. A package comprising a sealable thermoplastic film comprising:
   a) a first outer layer comprising between 40 and 60 wt % of a linear low density polyethylene, between 15 and 35 wt % of a medium density polyethylene, and between 15 wt % and 35 wt % of an ethylene-vinyl acetate copolymer, all wt % being based on the weight of the first outer layer;
   b) a second outer layer comprising between 40 and 60 wt % of a linear low density polyethylene, between 15 and 35 wt % of a medium density polyethylene, and between 15 wt % and 35 wt % of an ethylene-vinyl acetate copolymer, all wt % being based on the weight of the second outer layer; and
   c) an inner layer comprising between 80 and 97 wt % of a linear low density polyethylene and between 1 and 20 wt % of a low density polyethylene, wherein the total amount of polyethylene in the inner layer is at least 90 wt %, all wt % being based on the weight of the inner layer;
   the thermoplastic film having:
   an oxygen transmission rate between 8000 and 14000 cc/sqm·day·atm, measured according to ASTM D-3985 at 23° C. and 0% in-0% out relative humidity,
   a $CO_2$ transmission rate between 25000 to 41000 cc/sqm·day·atm, measured according to ASTM F-2476, at 23° C. and 0% in-0% out relative humidity,
   a water vapour transmission rate between 8 and 35 g/sqm·day·atm, measured according to ASTM D1249 at 38° C. and 98% in-0% out relative humidity, and
   a transmittance of less than 70% of light at wavelengths from the entirety of 200 to 400 nm, measured with the method as follows:

3 cm×1.7 cm pieces of film cut from portions of the film along a transverse direction are put into sample holders of a spectrophotometer equipped with a light source deuterium lamp (190-350 nm) and a halogen lamp (330-900 nm)

the spectrophotometer set to have a light wavelength range being 200-850 nm, under the following conditions:

resolution of 0.5 nm
response: medium
scanning speed: 100 nm/min
baseline flatness ±0.004 Abs
band width: 2 nm
photometric mode: absorbance
the instrument measured absorbance is converted by an integrated software into % transmittance,
and one or more fruits and/or vegetables packaged in said package.

16. The package according to claim 15, comprising one or more fruits selected from the group consisting of bananas and mangoes.

17. The package according to claim 15, wherein the thermoplastic film is oriented.

18. The package according to claim 15, wherein the thermoplastic film has an oxygen transmission rate between 10000 and 13000 cc/sqm·day·atm, measured according to ASTM D-3985 at 23° C. and 0% in-0% out relative humidity, a $CO_2$ transmission rate between 27000 to 39000 cc/sqm·day·atm, measured according to ASTM F-2476, at 23° C. and 0% in-0% out relative humidity, a water vapour transmission rate between 20 and 30 g/sqm·day·atm, measured according to ASTM D1249 at 38° C. and 98% in-0% out relative humidity, and a transmittance of less than 60% of light at wavelengths from the entirety of 200 to 400 nm, measured with the method as follows:

3 cm×1.7 cm pieces of film cut from portions of the film along a transverse direction are put into sample holders of a spectrophotometer equipped with a light source deuterium lamp (190-350 nm) and a halogen lamp (330-900 nm)

the spectrophotometer set to have a light wavelength range being 200-850 nm, under the following conditions:

resolution of 0.5 nm
response: medium
scanning speed: 100 nm/min
baseline flatness ±0.004 Abs
band width: 2 nm
photometric mode: absorbance
the instrument measured absorbance is converted by an integrated software into % transmittance.

* * * * *